United States Patent
Charrier et al.

(10) Patent No.: US 7,390,170 B2
(45) Date of Patent: Jun. 24, 2008

(54) DEVICE FOR ASSEMBLING ANNULAR FLANGES TOGETHER, IN PARTICULAR IN A TURBOMACHINE

(75) Inventors: Emmanuel Charrier, Blandy les Tours (FR); Jean-Luc Soupizon, Vaux le Penil (FR)

(73) Assignee: SNECMA, Paris (FR)

( * ) Notice: Subject to any disclaimer, the term of this patent is extended or adjusted under 35 U.S.C. 154(b) by 469 days.

(21) Appl. No.: 11/095,572

(22) Filed: Apr. 1, 2005

(65) Prior Publication Data
US 2005/0246889 A1 Nov. 10, 2005

(30) Foreign Application Priority Data
Apr. 9, 2004 (FR) .................................. 04 03737

(51) Int. Cl.
*F01D 25/00* (2006.01)

(52) U.S. Cl. ................................. 416/198 R; 415/216.1

(58) Field of Classification Search ............ 416/198 A, 416/201 R, 220 R; 415/216.1, 199.5; 403/335–338, 403/348, 349, 408.1; 285/93
See application file for complete search history.

(56) References Cited

U.S. PATENT DOCUMENTS

| | | | |
|---|---|---|---|
| 2,523,928 A | 9/1950 | Szekely | |
| 3,661,475 A * | 5/1972 | Anderson et al. | 416/219 R |
| 3,765,795 A * | 10/1973 | Koff | 416/198 R |
| 5,401,062 A | 3/1995 | Vowles | |
| 6,312,215 B1 * | 11/2001 | Walker | 415/9 |
| 6,499,957 B1 | 12/2002 | Klingels et al. | |

FOREIGN PATENT DOCUMENTS

| | | |
|---|---|---|
| DE | 3532929 A1 | 3/1987 |
| GB | 800491 | 8/1958 |
| GB | 871110 | 6/1961 |
| GB | 1 453 458 | 10/1976 |

* cited by examiner

*Primary Examiner*—Ninh H Nguyen
(74) *Attorney, Agent, or Firm*—Oblon, Spivak, McClelland, Maier & Neustadt, P.C.

(57) ABSTRACT

A device for assembling together annular flanges by means of fastening bolts, in particular in a low-pressure turbine stage of the turbojet, one of the flanges has an element projecting from its face that faces the other flange and that is received in a notch in said other flange when the relative angular positioning of the two flanges is correct.

13 Claims, 4 Drawing Sheets

DEVICE FOR ASSEMBLING ANNULAR FLANGES TOGETHER, IN PARTICULAR IN A TURBOMACHINE

The invention relates to a device for assembling annular flanges together, in particular flanges for fastening together the parts of a rotor or a stator in a turbomachine.

BACKGROUND OF THE INVENTION

In the low-pressure turbine stages of turbojets, parts are assembled to one another by means of annular flanges pressed against one another and fastened together by bolts which pass through orifices in the annular flanges, these orifices being distributed regularly around the annular flanges.

Some such flanges are "festooned", i.e. their through orifices for fastening bolts are formed in solid portions which are separated from one another by notches giving such annular flanges a "festooned" shape, in other words a shape that is crenellated with edges that are rounded or rectangular.

For a low-pressure turbine of a turbojet, the various parts are stacked vertically on one another, and they are then fastened together by means of bolts which are passed blind through the orifices in the annular flanges. It can thus happen that a festooned flange is angularly offset relative to the other flanges by half of the pitch between the through orifices for passing the fastening bolts, and under such circumstances, the bolts threaded through the orifices in the other flanges pass through the notches in the offset festooned flange, and not through the orifices provided in the solid portions of that flange. Under such circumstances, the offset flange is not securely fastened to the other flanges since it is merely clamped axially between the other flanges, and it might move angularly or radially in the event of the fastening bolts loosening or under centrifugal forces.

No known means are provided to ensure proper angular positioning of annular fastening flanges, other than the care taken by operatives performing assembly, and no means are provided for warning operatives that angular positioning is bad.

OBJECTS AND SUMMARY OF THE INVENTION

The invention seeks in particular to provide a solution to this problem that is simple, effective, and inexpensive.

To this end, the invention provides a device for assembling together two annular flanges, such as flanges for fastening together parts of a turbomachine rotor or stator, the device comprising fastening means such as bolts or the like passing through orifices in said flanges, wherein a first of the flanges is of a festooned or crenellated shape and has notches formed between solid portions including the orifices for passing the fastening means, and wherein the other annular flange presents at least one projecting element on its face facing towards the first flange, said projecting element being for engaging in a notch of the first flange when the angular positioning of the two flanges relative to each other is correct.

By means of these projecting elements which engage axially in the notches, the stacked flanges are properly pressed one against another when their relative angular positioning is correct. Otherwise, the two flanges are spaced apart axially from each other and this axial spacing can be perceived by the operative performing the assembly, who is thereby informed of the wrong angular positioning of the flanges and can take remedial action.

The projecting element constitutes keying means informing the operative if the angular positioning between the flanges is or is not correct.

In a first embodiment of the invention, the above-mentioned projecting element is a peg fitted onto one of the two flanges.

In a variant embodiment of the invention, the above-specified projecting element is a stud machined or cut out from one of the two flanges.

In both these embodiments, the peg or the stud projecting from the flange can engage in any of the notches of the other flange when the relative angular positioning between the two flanges is correct. Otherwise, the peg or the stud comes into abutment against a solid portion and prevents the two flanges from being pressed axially one against the other.

The device of the invention is intended more particularly for assembling together the annular fastening flanges that are presented by rotor disks, by a drive cone, or by a part for axially retaining the blade roots on one of the disks in a turbomachine, in particular in a low-pressure turbine of a turbojet, however the device is more generally applicable throughout industry, whenever a festooned or crenellated annular flange needs to be assembled with another annular flange.

BRIEF DESCRIPTION OF THE DRAWINGS

The invention will be better understood and other characteristics, details, and advantages thereof will appear more clearly on reading the following description made by way of non-limiting example and with reference to the accompanying drawings, in which.

MORE DETAILED DESCRIPTION

Figure 1:
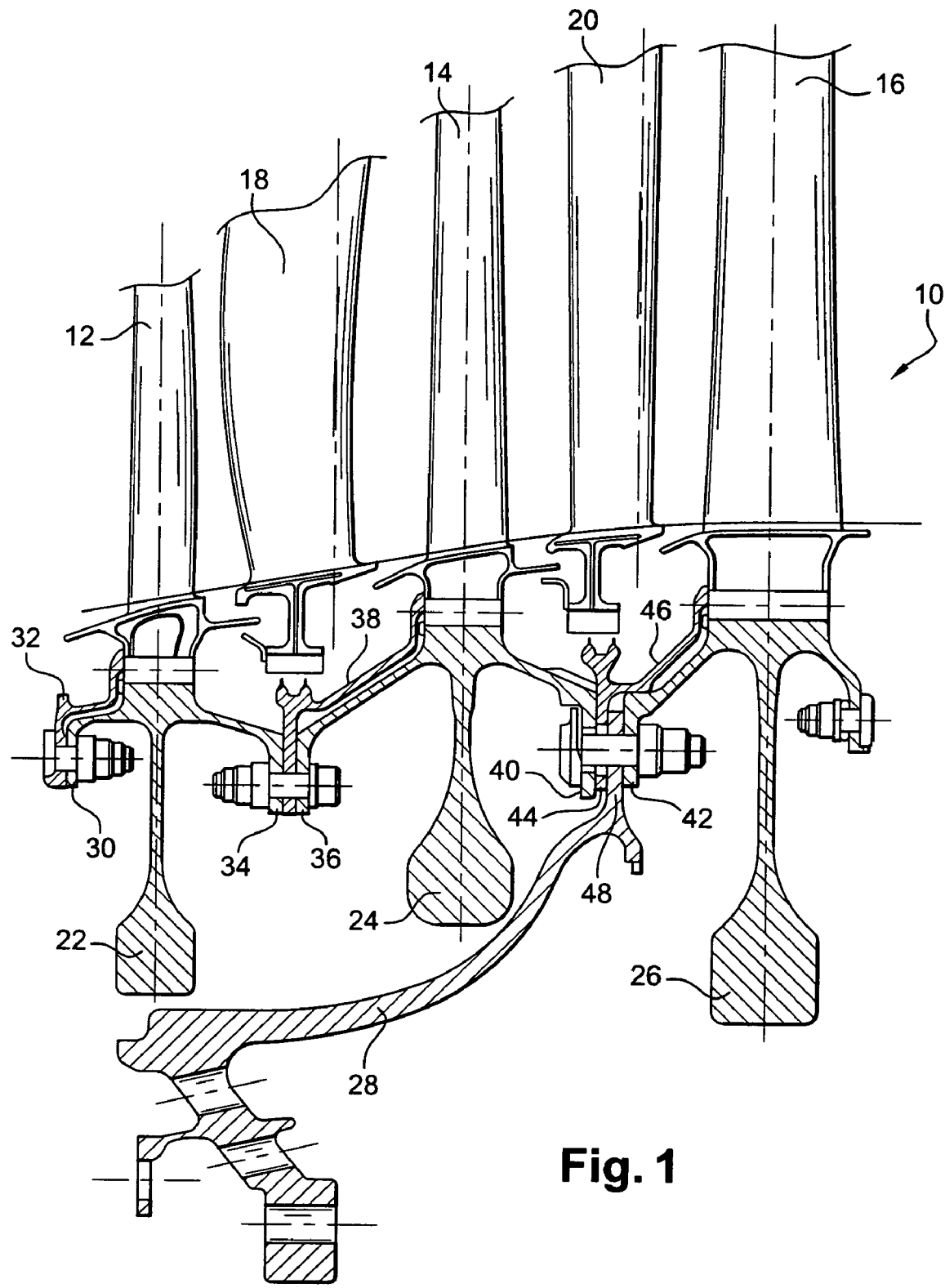
FIG. 1 is a diagrammatic fragmentary section view of a low-pressure turbine of a turbojet, showing annular flanges assembled in the prior art manner.

FIG. 1 is a fragmentary view of a low-pressure turbine 10 of a turbojet, having three stages of moving blades 12, 14, and 16, and two stages of stationary vanes 18, 20.

The radially outer ends of the stationary vanes 18, 20 are mounted by means (not shown) to the casing of the turbojet, and the radially inner ends of the moving blades 12, 14, and 16 are mounted by suitable means, e.g. dovetails or the like, to three disks 22, 24, and 26 of the rotor.

Each disk 22, 24, and 26 has an upstream annular flange and a downstream annular flange, these flanges serving for fastening the disks to one another and to a drive cone 28 connected to the shaft of the turbomachine, and also serving to fasten annuluses for retaining the blade roots on the disks.

More precisely, the upstream disk 22 has an upstream annular flange 30 having an annulus 32 fastened thereto by means of bolts, the annulus 32 serving to retain the roots of the blades 12 on the disk 22, and also has a downstream annular flange 34 fastened by bolts to an upstream annular flange 36 of the intermediate disk 24, and to an annulus 38 for retaining the roots of the blades 14 on the intermediate disk 24.

The intermediate disk 24 has a downstream annular flange 40 fastened by bolts to an upstream annular flange 42 of the downstream disk 26 and to an annular flange 44 of an annulus 46 for retaining the roots of the blades 16 on the disk 26, and to an annular flange 48 of the drive cone 28, the flanges 44 and 48 being clamped between the annular flanges 40 and 42 of the disks 24 and 26.

Figure 2:
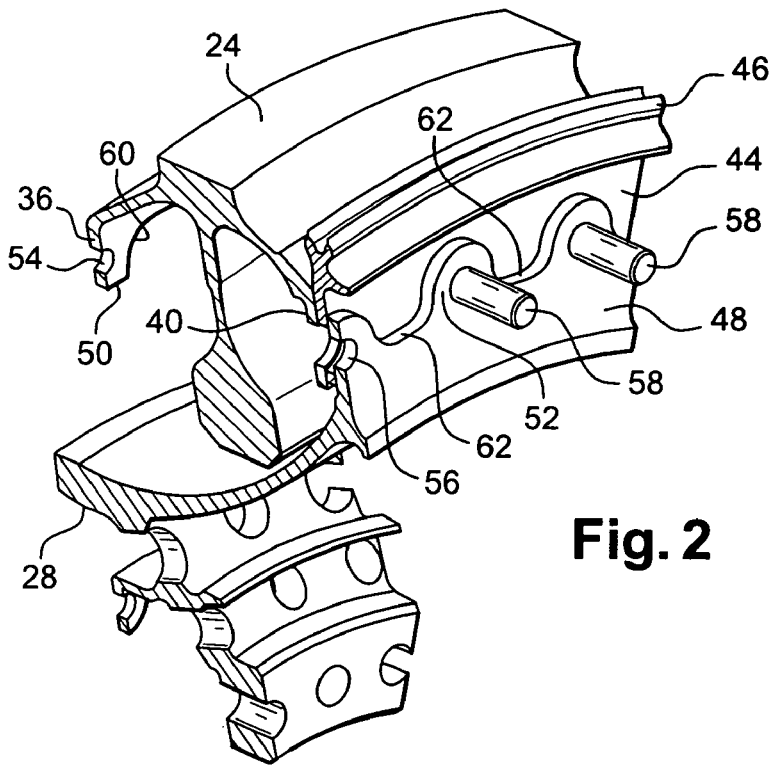
FIG. 2 is a diagrammatic fragmentary perspective view showing the proper angular positioning of three flanges of the FIG. 1 device.
Figure 3:
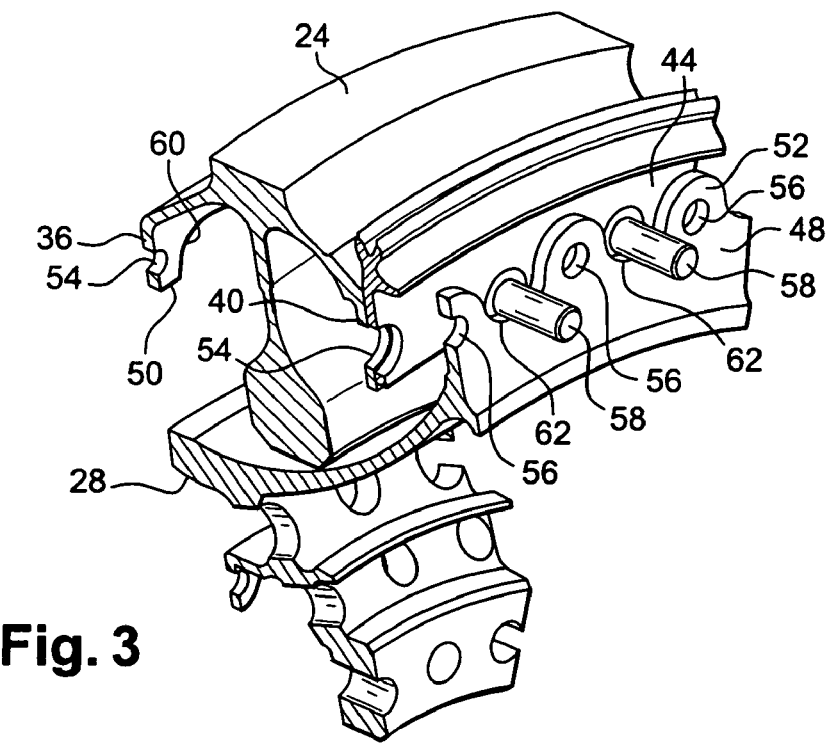
FIG. 3 is a diagrammatic fragmentary perspective view showing wrong angular positioning of the three flanges of the FIG. 1 device.

The assembly device of the invention applies more particularly to the annular flanges 40, 42, 44, and 48 of the disks 24 and 26, of the annulus 46, and of the drive cone 28, having characteristics that can be seen more clearly in FIGS. 2 and 3, but it could optionally also be applied to the flanges 34, 36 and to the annulus 38.

In FIGS. 2 and 3, it can be seen that the annular flanges 36 and 40 of the disk 24 and the annular flange 48 of the drive cone are festooned or crenellated, i.e. have solid portions 50, 52 with orifices 54, 56 for passing fastening bolts 58, said solid portions 50, 52 being separated from one another by notches 60, 62.

The annular flange 42 of the downstream disk 26 (not shown in FIGS. 2 and 3), is also festooned. Only the annular flange 44 of the annulus 46 for retaining the roots of the blades 16 on the downstream disk 26 is not festooned and extends continuously over 360°.

During mounting, the disks are stacked vertically on one another and the fastening bolts 58 are mounted blind. The heads of the bolts bear against the downstream annular flange 40 of the intermediate disk 24 and nuts bear against the annular flange 42 of the downstream disk 26. The bolts are engaged in the orifices formed in the continuous annular flange 44 of the annulus 46 without any risk of error, and they ought to be engaged in the orifices 56 of the festooned annular flange 48 of the drive cone 28 as shown in FIG. 2.

Because the parts are stacked axially and the fastening bolts are then mounted blind, it can happen that the annular flange 48 of the drive cone 28 is not angularly positioned properly relative to the other annular flanges and is angularly offset by half of the pitch between the through orifices 56 for passing the bolts, as shown in FIG. 3.

Under such circumstances, the bolts 58 are engaged in the orifices 54 of the annular flange 40 of the disk 24, in the orifices in the continuous annular flange 44 of the annulus 46, and in the orifices formed in the annular flange 42 of the downstream disk 26, passing between the solid portions 52 of the annular flange 48 of the drive cone 28, which means that the drive cone is then not reliably fastened to the other flanges, but is merely clamped axially between the annular flange 44 of the annulus 46 and the annular flange 42 of the downstream disk 26.

Figure 4:
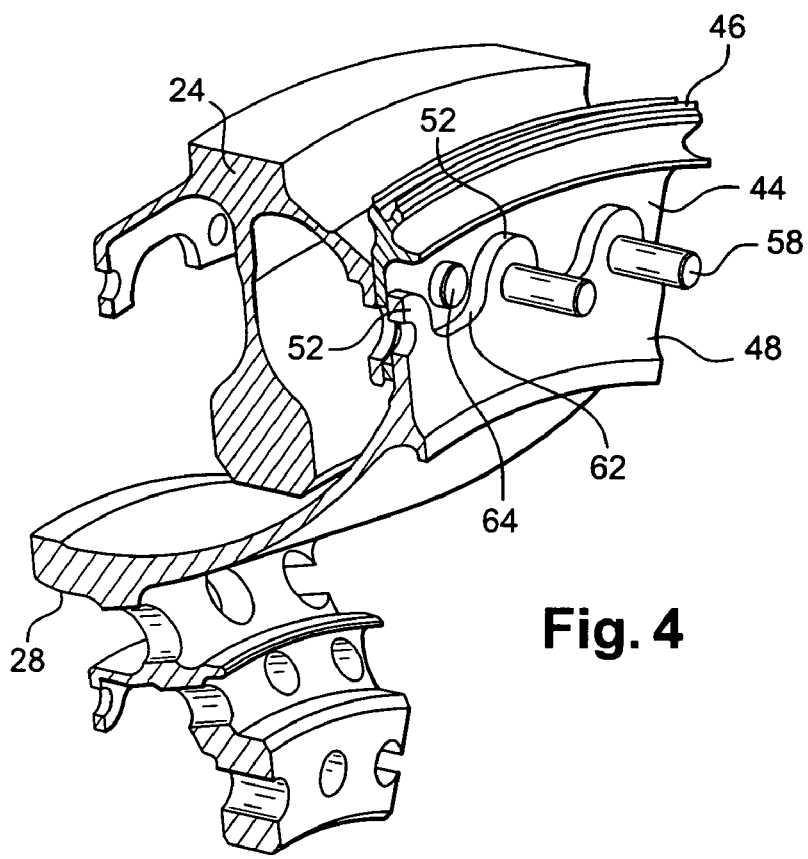
FIG. 4 is a diagrammatic fragmentary perspective view corresponding to FIG. 2 and showing a first embodiment of the device of the invention.
Figure 5:
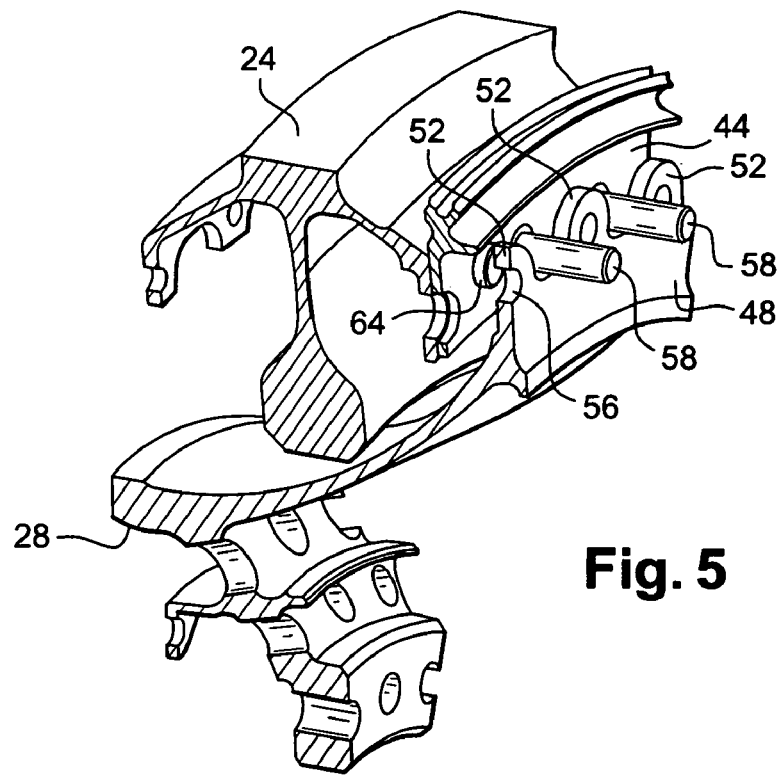
FIG. 5 is a diagrammatic fragmentary perspective view corresponding to FIG. 3 and showing the first embodiment of the device of the invention.
Figure 6:
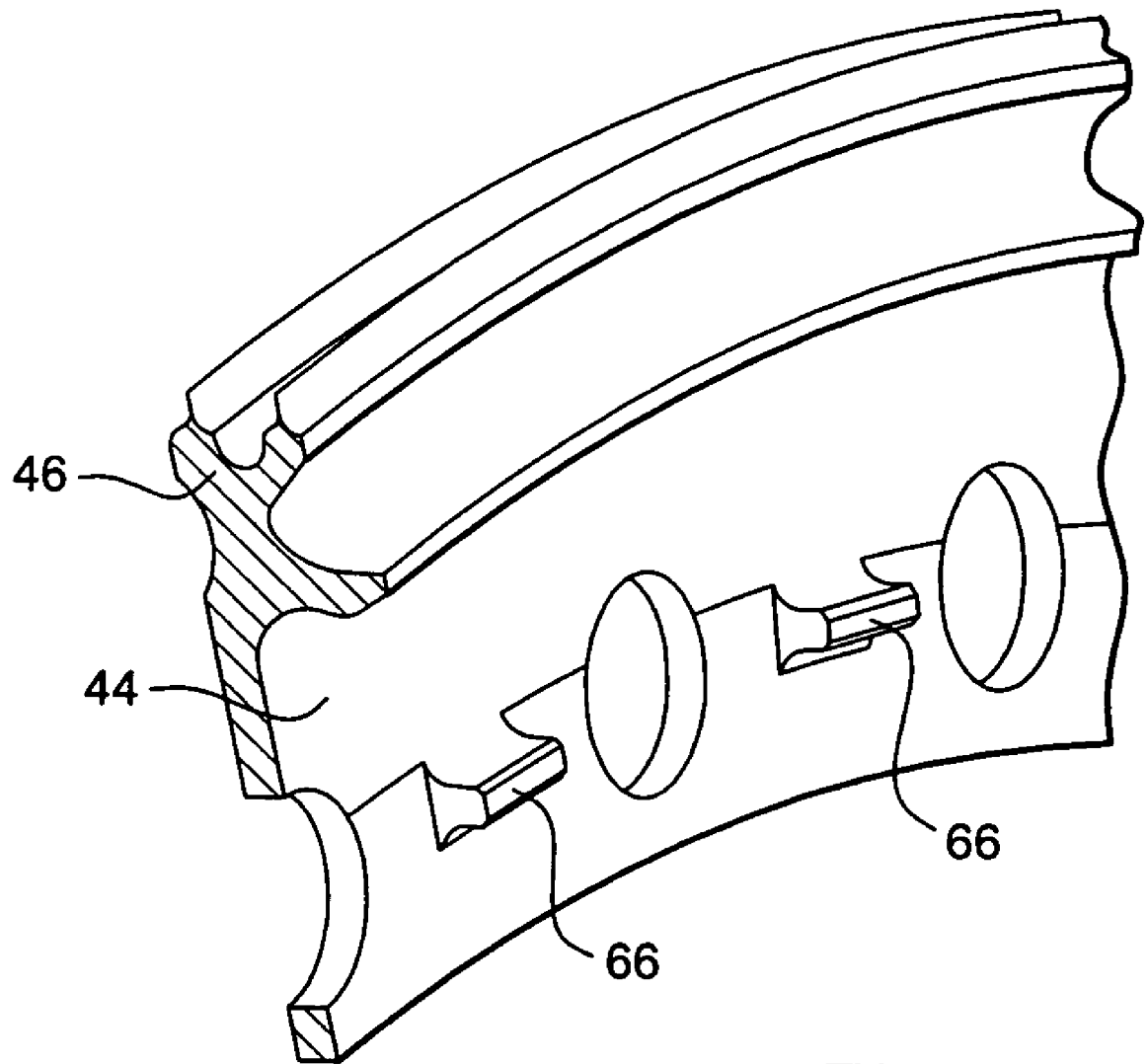
FIG. 6 is a diagrammatic fragmentary perspective view of a flange in a second embodiment of the invention.

The object of the device of the invention is to avoid this drawback by using the means that are shown diagrammatically in FIGS. 4 to 6.

In a first embodiment of the invention (shown in FIG. 4), these means comprise a cylindrical peg 64 formed to project axially from the face of the annular flange 44 of the annulus 46 that is to be pressed against the annular flange 48 of the drive cone 28.

The cylindrical peg 64 is situated substantially halfway between two consecutive orifices and it is of a diameter greater than the diameter of the orifices 56 for passing the bolts 58 so as to prevent it from penetrating into said passages.

In a variant, the peg 64 could be of arbitrary diameter and radially offset relative to the orifices 56 for passing the bolts 58.

In this manner, when the angular positioning of the annular flanges is correct and the bolts 58 pass through the orifices formed in the annular flange 48 of the drive cone 28, the peg 64 is located, as shown in FIG. 4, between two solid portions 52 of the annular flange 48, and does not prevent the annular flanges 44 and 48 from being pressed against each other.

In contrast, when the flanges 44 and 48 are in an incorrect angular position, as shown in FIG. 5, i.e. when the bolts 58 pass between the solid portions 52 of the annular flange 48 of the drive cone, the cylindrical peg 64 comes to bear against a solid portion 52 of the annular flange 48 and prevents the annular flanges 44 and 48 from being pressed against each other. The axial offset between the two flanges can be perceived by the operative building up the assembly, who can thus correct the angular positioning of the annular flanges and put the bolts 58 back into place, while ensuring that they pass through the orifices 56 in the annular flange 48 of the drive cone.

Naturally, the annular flange 44 of the annulus 46 could carry a plurality of cylindrical pegs 64, advantageously distributed symmetrically around the axis of the rotation.

By way of example, the cylindrical peg(s) 64 is/are fitted to the annular flange 44, being secured thereto by screw fastening, riveting, or by any other appropriate means.

In the variant embodiment shown in FIG. 6, the annular flange 44 of the annulus 46 has one or more studs 66 on its face that is to be pressed against the annular flange 48 of the drive cone, these studs being positioned like the above-mentioned cylindrical peg(s) 64 between the orifices for passing the fastening bolts. Unlike the fitted cylindrical pegs 64, these studs 66 are machined out of the material forming the annular flange 44.

Naturally, various modifications that are obvious to the person skilled in the art can be applied to the means described and shown providing the correct angular positioning of the annular flanges is defined by at least one projecting element formed on one of the flanges engaging in a notch of the other flange.

What is claimed is:

1. A device for assembling together two annular flanges of a turbomachine rotor or stator, the device comprising a fastener passing through orifices in said annular flanges, wherein a first of the annular flanges is of a festooned or crenellated shape and has notches formed between solid portions including said orifices, and wherein the second annular flange comprises a keying mechanism that cooperates with the first annular flange during mounting of the annular flanges and configured to provide an indication of whether or not an angular position of the first and second annular flanges relative to each other is correct, said keying mechanism comprising at least one projecting element formed on a face of the second annular flange facing towards the first annular flange, said at least one projecting element being configured to engage in a notch of the first annular flange when said angular position of the two annular flanges relative to each other is correct.

2. A device according to claim 1, wherein said at least one projecting element spaces the two annular flanges axially apart from each other when the angular positioning of the two annular flanges is incorrect.

3. A device according to claim 1, wherein the at least one projecting element is a peg fitted onto said second annular flange.

4. A device according to claim 3, wherein said peg is situated substantially halfway between two consecutive orifices and is of a diameter greater than a diameter of said orifices.

5. A device according to claim 1, wherein said fastener comprises bolts.

6. A device according to claim 1, wherein:
when said angular position is not correct, said projecting element is configured to prevent said angular flanges from being pressed against each other so that an axial offset is present between said angular flanges, said axial offset indicating that said angular position is not correct, and
when said angular position is correct, said projecting element is configured to not prevent said angular flanges from being pressed against each other, so that no axial offset is present between said angular flanges, an absence of said axial offset indicating that said angular position is correct.

7. A device for assembling together two annular flanges of a turbomachine part, the device comprising a fastener passing through orifices in said annular flanges, wherein a first of the annular flanges has notches formed between solid portions including said orifices, and wherein the second annular flange comprises at least one projecting element formed on a face of the second annular flange facing towards the first annular flange, said at least one projecting element being configured to engage in a notch of the first annular flange when said angular position of the two annular flanges relative to each other is correct, and
wherein the at least one projecting element is a stud machined or cut out of the material of said second annular flange.

8. A device according to claim 7, wherein said first annular flange is of a festooned or crenellated shape.

9. A device according to claim 7, wherein said turbomachine part is a rotor or a stator.

10. A turbomachine comprising:
a first annular flange;
a second annular flange; and
a device configured to fix together said first annular flange and said second annular flange, wherein said device comprises a fastener passing through orifices in said annular flanges, wherein a first of the annular flanges has notches formed between solid portions including said orifices, and wherein the second annular flange comprises a keying mechanism that cooperates with the first annular flange during mounting of the annular flanges and configured to provide an indication of whether or not an angular position of the first and second annular flanges relative to each other is correct, said keying mechanism comprising at least one projecting element formed on a face of the second annular flange facing towards the first annular flange, said at least one projecting element being configured to engage in a notch of the first annular flange when said angular position of the two annular flanges relative to each other is correct.

11. The turbomachine of claim 10, comprising;
a first rotor disk with said first annular flange; and
a second rotor disk with said second annular flange.

12. The turbomachine of claim 10, comprising:
an annulus for retaining blade roots on a rotor disk, said annulus comprising said first annular flange; and
a drive cone comprising said second annular flange.

13. A turbomachine according to claim 12, wherein the second annular flange of the drive cone is festooned or crenellated and the first annular flange of the annulus is clamped axially against the second annular flange of the drive cone and includes at least one projecting element for engaging in at least one notch of the second annular flange of the drive cone when the angular position of the first and second annular flanges relative to one each other is correct.

* * * * *